United States Patent [19]

Hashiya

[11] 4,426,135
[45] Jan. 17, 1984

[54] LENS ATTCHMENT FOR FORMING WIDE-RANGING IMAGES

[75] Inventor: Minoru Hashiya, Tokyo, Japan

[73] Assignee: Shinano Kikaku Co., Ltd., Tokyo, Japan

[21] Appl. No.: 194,297

[22] PCT Filed: Jan. 5, 1979

[86] PCT No.: PCT/JP79/00003
§ 371 Date: Jan. 22, 1980
§ 102(e) Date: Aug. 13, 1979

[87] PCT Pub. No.: WO79/01091
PCT Pub. Date: Dec. 13, 1979

[30] Foreign Application Priority Data

May 22, 1978 [JP] Japan .................. 53/61295
Nov. 17, 1978 [JP] Japan .................. 53/142462

[51] Int. Cl.³ .............. G02B 7/02; G02B 13/08; G02B 15/02
[52] U.S. Cl. ................... 350/422; 350/420; 350/453
[58] Field of Search ............ 350/422, 453, 420, 429

[56] References Cited

U.S. PATENT DOCUMENTS

| | | | |
|---|---|---|---|
| 2,752,821 | 7/1956 | Cook | 350/453 X |
| 2,932,236 | 4/1960 | Delano | 350/453 X |
| 2,956,475 | 10/1960 | Harris et al. | 350/453 X |
| 3,002,427 | 10/1961 | Schafter et al. | 350/453 X |
| 3,511,557 | 5/1970 | Lindstedt et al. | 350/453 X |
| 3,736,049 | 5/1973 | Shimizu | 350/453 X |
| 3,761,162 | 9/1973 | Hall | 350/420 X |

Primary Examiner—John K. Corbin
Assistant Examiner—Scott J. Sugarman
Attorney, Agent, or Firm—Koda and Androlia

[57] ABSTRACT

The invention provides a lens attachment adapted for use as a supplemental attachment to optical instruments, such as cameras, enlargers, when they are employed to form wide-ranging images upon a wide screen for example.

According to the invention, the lens attachment comprises a master lens having focal length $f_M$ and a front member having focal length $f_A$ and a rear member having focal length $f_B$, each member including cylindrical lenses, said front member and said rear member as a whole being located in front of said master lens, wherein said $f_B$ satisfies: $4f_M \geq |f_B| \geq 2f_M$ In addition, the lenses are readily combined on a mount in fitting relationship with the use of tenons and recesses adapted to receive said tenons, thereby securing precise centering of the lenses.

Thus, the distance between the rear member and the master lens is extremely shortened, and the diameters of both lenses are made substantially equal.

3 Claims, 4 Drawing Figures

LENS ATTCHMENT FOR FORMING WIDE-RANGING IMAGES

FIELD OF THE INVENTION

The present invention relates to a lens attachment used for optical instruments, such as photograph camera, motion-picture cameras, motion-picture projectors and enlargers, when they are employed to form wide-ranging images like those on a cinemascope.

DESCRIPTION OF THE PRIOR ART

When a main lens or lenses of an ordinary type (hereinafter referred to as the master lens) having a projective range of 6° to 7° is employed to form wide-ranging images upon a cinemascope for example, the common practice is to attach an extra lens unit to the master lens, the extra lens unit being commonly called a converter (hereinafter referred to as the converter). The converter consists of cylindrical lenses capable of forming horizontally widened images.

In such cases, however, the converter cannot be directly attached to the master lens because of the large effective diameter and weight of its rear member, thereby requiring the converter to be mounted on a special fixture adapted to be secured to the main instrument body by screws. Under this arrangement, a high degree of skill is required for securing precise centering of the lenses. In addition, attaching and detaching are time-consuming labor. To solve the difficulty of securing precise centering of the lenses through the converter to the master lens, it is previously arranged in the converter that each focal length of the front and rear members is relatively large; however, this means that the lenses in each member are accordingly spaced, thereby resulting in an increased effective diameter of the lenses. Thus, the converter as a whole unavoidably becomes large and heavy.

For a better understanding of the conventional converter system, it will be more particularly explained:

Normally, the tolerance in centering lens axes between the converter and the master lens is ±0.02 mm at maximum, and a permissible eccentricity is about 2' in which no appreciable degree of adverse effect will result. Now, let us suppose that an 8 mm motion-picture camera has a master lens having a focal length ($f_M$) of 25.0 mm; then the permissible eccentricity of the rear member, in terms of focal length, will be:

$$|f_B| = \frac{0.2 \text{ mm}}{\tan 2'} \approx 350 \text{ mm}$$

In the case of a cinemascope, the magnifying power of the converter ($\beta$) may be 0.5; then the focal length of the front member ($f_A$) will be:

$$f_A = -0.5 f_B$$
$$= -175 \text{ mm}$$

FIG. 1 shows the conventional arrangement of lenses on the actual scale, in which the front member 1', the rear member 2', the master lens 3' and a film 4 are respectively arranged. As evident from the drawing, the rear member 2' has a relatively large effective diameter compared with that of the master lens 3', and the distance therebetween is also disadvantageously large.

When forming wide-ranging images on a wide screen, the optical instrument requires the provision of cylindrical lenses capable of directional widening, and in order to achieve it, all the lenses must be properly centered, that is, the center of curvature of all the lens surfaces should line on the lens axis, so as to constitute a unitary optical system. However, it is difficult to properly combine these lenses in a mount especially when they are made of glass. In addition, when such a complete set of lenses including cylindrical lenses is attached to the main optical instrument with the use of screws or any other fastening means in the same manner as when a convertible lens or any other attachment is mounted, it may happen that wide-ranging images are projected on the wide screen in their tilting posture although the lenses are properly centered.

DISCLOSURE OF THE INVENTION

A feature of the present invention lies in that:

When the focal lengths of the front member and the rear member of the converter, and of the master lens are $f_A$, $f_B$ and $f_M$, respectively, a relationship among them can be established:

$$4f_M \geqq |f_B| \geqq 2f_M \tag{1}$$

and that the focal length ($f_B$) of the rear member is determined such that the above Formula (1) is satisfied. As a result, the diameter of the rear member is reduced substantially to that of the master lens, and additionally, the diameter of the front member and the length of the cylindrical mount are considerably reduced compared with those under the conventional converter system. From Formula (1), it will be understood that if $f_B$ is larger than $4f_M$, the converter as a whole will be increased in size, and that if $f_B$ is smaller than $2f_M$, the difficulty of compensating aberration results, and additionally, the arrangement of lenses become complicated.

Another feature of the present invention is that the front member and the rear member consisting of cylindrical lenses are all made of optical plastics, thereby securing a light weight, easy assembling and troublefree adjustment of the lens axis. This leans to a reduced production cost. More concretely, the front member and the rear member are provided with tiny tenons at their rim portion, and the mount includes recesses adapted to receive the tenons, so as to combine the lenses in a correct relationship with no special care in adjustment. This also eliminates the necessity for a supplemental inspection instrument and a lens fixing apparatus.

DESCRIPTION OF A PREFERRED EMBODIMENT

By taking an example for an 8 mm motion-picture camera, a preferred embodiment will be described:

Likewise, let us suppose that the focal length of the master lens ($f_M$) is 25.0 mm, and that the focal length of the rear member of the converter, i.e. $f_B$ is equal to the upper limit in Formula (1), that is:

$$f_B = 4f_M = 100.0 \text{ mm}$$

Table 1 numerically shows the mode of lens arrangement in this embodiment. In Table 1, R(mm) is the curvature of lens surface, D(mm) is the distance from a first lens surface to the neibouring second lens surface, N is the refractive index of an object in front of the first lens surface, $\gamma$ is the gamma value of the object, and $\phi$ (mm) is the effective diameter of the lens. The cardinal number 1, 2, 3 . . . shows the lens number, which is appended to each lens.

From Table 1, it will be understood that the effective diameter of the front member of the converter, i.e. $\phi_1$ is 28.0 mm and that the total length of the converter $$\sum_{i=1}^{8} D_i = 65.4 \text{ mm}.$$

Figure 1:
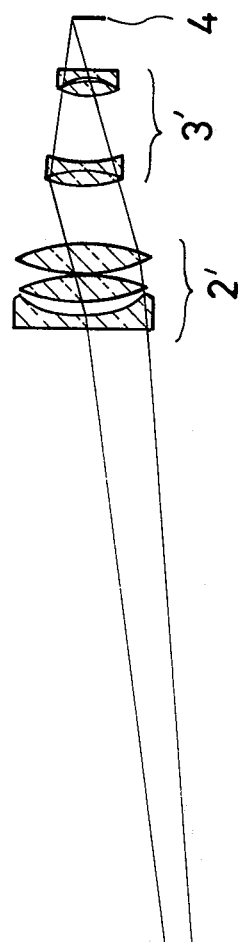
FIG. 1 shows a conventional arrangement of lenses.
Figure 2:
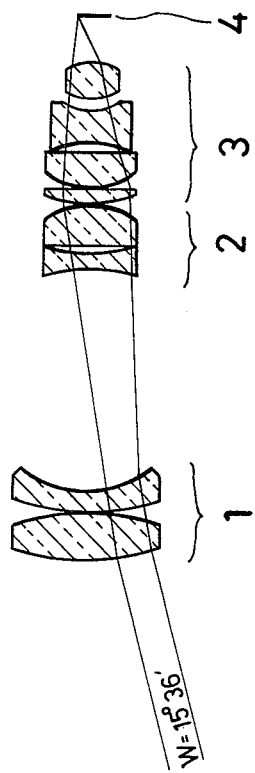
FIG. 2 shows the arrangement of lenses according to the present invention.

FIG. 2 shows the arrangement made on the basis of the data in Table 1, in which the front member 1 and the rear member 2 consist of cylindrical lenses while the master lens 3 consists of an ordinary non-directional type of lenses. Reference numeral 4 denotes a film.

Figure 3:
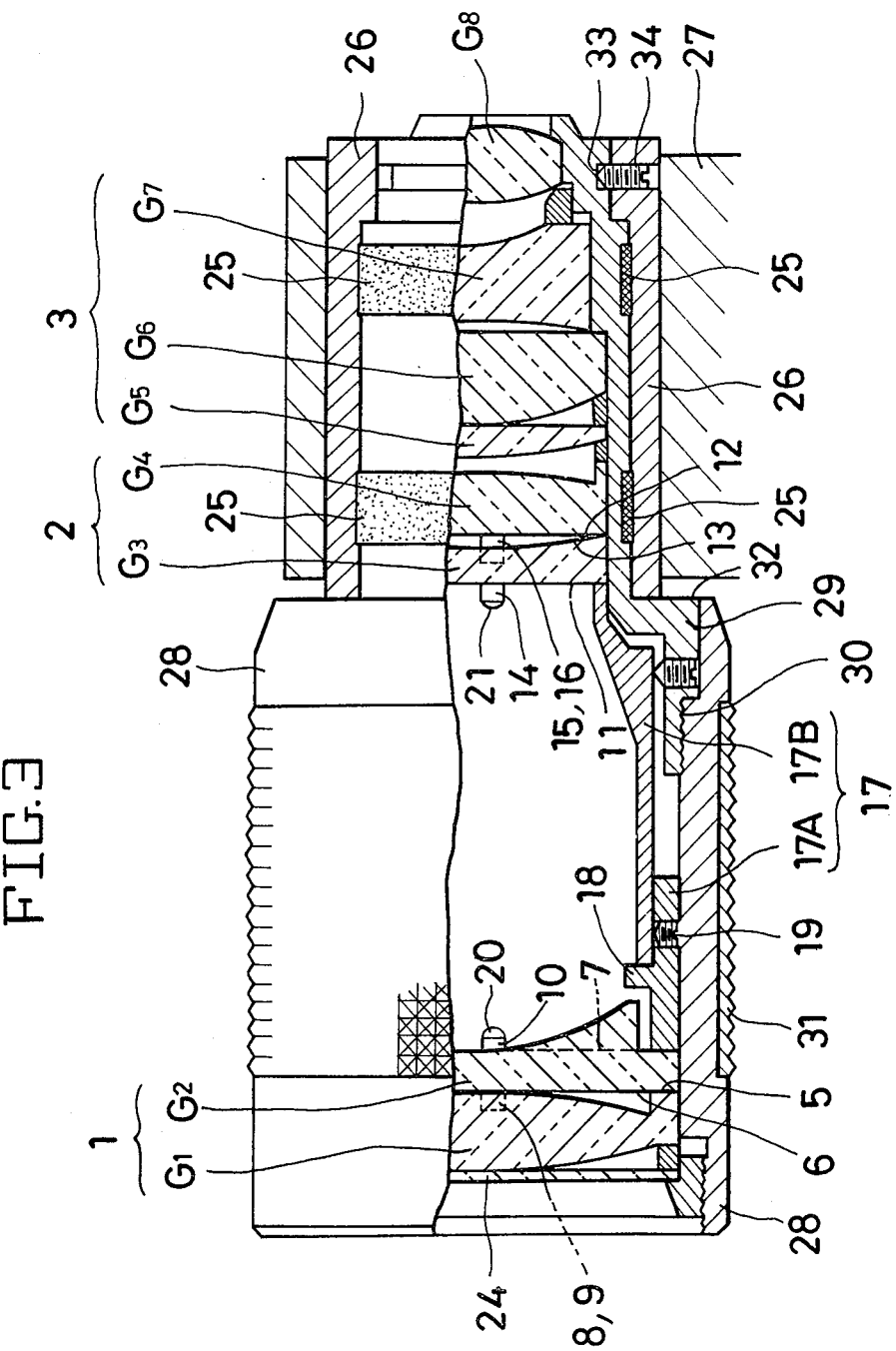
FIG. 3 is a partial sectional view of the arrangement shown in FIG. 2.
Figure 4:
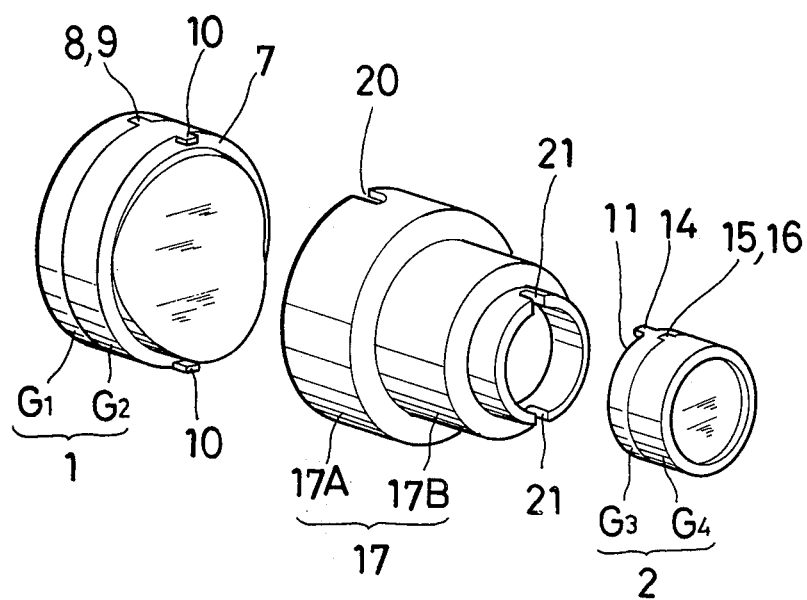
FIG. 4 is a perspective view showing individual components separated from each other under the arrangement shown in FIG. 2.

In FIG. 3, a more concrete arrangement of the lenses is shown. The front member 1 includes lenses $G_1$ and $G_2$, and the rear member 2 includes lenses $G_3$ and $G_4$. The master lens 3 includes lenses $G_5$, $G_6$, $G_7$ and $G_8$.

The lenses $G_1$, $G_2$, $G_3$ and $G_4$ are made of optical plastics, each consisting of a lens portion and a rim portion produced in one body. The lens $G_1$ is provided with a pair of recesses 8, each being located at diametrically opposite side of the rim. Reference numeral 5 denotes the inner end face of the lens $G_1$ adapted to meet the outer end face 6 of the lens $G_2$ in which tenons 9 are provided so as to fit in the recesses 8. The inner end face 7 of the lens $G_2$ includes a pair of tenons 10, each being located at diametrically opposite side of its rim. Likewise, the lens $G_3$ of the rear member is provided with a pair of tenons 14, each being located at diametrically opposite side of its rim, in which reference numeral 11 denotes the outer end surface of the lens $G_3$. The lens $G_3$ includes a pair of recesses 15 in its inner end surface 12, so as to receive tenons 16 provided in the outer end face 13 of the lens $G_4$. These tenons and recesses are produced axially with the common lens axis in the peripheral surface of the rims of each lens. In producing the tenons and recesses, it must be noted that no projection is permitted on the peripheral rim surface.

In connecting the front member 1 to the rear member 2, a cylindrical coupler or mount 17 is employed, consisting of dividable two parts $17_A$ and $17_B$. The rear part $17_B$ is rotatably inserted in the front part $17_A$, and can be secured thereto by means of set screws 19, wherein the rear part $17_B$ is stopped from its further insertion by a ring-shaped flange 18 produced on the inside wall of the front part $17_A$. When the set screws 19 are unfastened, the front part $17_A$ can also be rotated with respect to the rear part $17_B$. The front part $17_A$ is provided with a pair of recesses 20, each being located at diametrically opposite side of the rim, which recesses are adapted to receive the tenons 10 of the lens $G_2$. Likewise, the rear part $17_B$ is provided with a pair of recesses 21, so as to receive the tenons 14 of the lens $G_3$. Preferably, the front part $17_A$ and the rear part $17_B$ are fastened to each other by means of the set screw 19 such that the recesses 20 and 21 position on the same plane passing through the lens axis.

When the lenses $G_1$ to $G_4$ are to be combined on the coupler 17, they are connected from one to another by fitting one tenon in the recess of the neiboring component. In this way the assembling is readily finished with no use of any special skill and experience. When the lens is found to be improperly mounted, it can be easily corrected by loosening the set screw 19, thereby facilitating precise setting of the lenses. FIG. 2 shows that the lenses are properly combined, in which the coupler 17 is omitted for simplicity.

The coupler 17 is covered with a cylindrical casing composed of dividable first part 28 and second part 29 jointed to each other by means of threads 30. The first part 28 covers the lenses $G_1$ and $G_2$, a protector glass plate 24 fitted in front of the lens $G_1$, and the front part $17_A$ of the coupler. The second part 29 covers the lenses $G_3$ and $G_4$, the lenses $G_5$ to $G_6$ of the master lens, and the rear part $17_B$ of the coupler. The second part 28 includes a shoulder portion 32 adapted to face a main optical instrument 27. The first part 28 is provided with a ring-shaped rubber band 31; prefereably, the rubber band has a dented surface as shown in FIG. 3, so as to impart friction to an operator's hand.

The second part 29 of the casing extends beyond the shoulder portion 32 (hereinafter referred to as the rearward portion). This rearward portion is provided with two ring-shaped bands of soft material, such as blanket material, flocked cloth, non-woven cloth, and is rotatably supported in a sleeve 26, which is secured to the main optical instrument 27 in a known suitable manner. The sleeve 26 is provided with a retractible screw 34, and the rearward portion is provided with ring-shaped groove 33 adapted to receive the screw 34 therein. Owing to the interposition of the bands 25, a ring-shaped space is slightly produced between the rearward portion and the sleeve 26, thereby reducing friction likely to occur during the rotation of the rearward portion in the sleeve. In addition, the rearward portion is precisely rotated about its own axis under the guidance by the screw 34 fitting in the ring-shaped groove 33, thereby allowing of no deviation thereof in the axial direction. Thus, a distance between the lenses and the film 4 is maintained in its proper state.

APPLICATIONS OF THE INVENTION

The lens attachment according to the present invention is used as a convertible lens for a photograph camera, a motion-picture camera, and an enlarger, and also it is used as a supplemental lens unit for attachment to the main master lens.

TABLE 1

| Type of Lenses | Lens No. | Curvature mm | Distance mm | Refractive Index | $\nu$ value | Effective Diameter mm |
|---|---|---|---|---|---|---|
| Front Member | $G_1$ | $R_1 = 159.35$ | $D_1 = 6.0$ | $N_1 = 1.0$ | $\nu_1 = 1.0$ | $\phi_1 = 28.0$ |
| | | $R_2 = -159.35$ | $D_2 = 0.2$ | $N_2 = 1.58600$ | $\nu_2 = 34.8$ | $\phi_2 = 28.0$ |
| | $G_2$ | $R_3 = \infty$ | $D_3 = 3.3$ | $N_3 = 1.0$ | $\nu_3 = 1.0$ | $\phi_3 = 28.0$ |
| | | $R_4 = 18.56$ | $D_4 = 37.64$ | $N_4 = 1.49200$ | $\nu_4 = 57.8$ | $\phi_4 = 28.0$ |
| Rear | $G_3$ | $R_5 = \infty$ | $D_5 = 3.0$ | $N_5 = 1.0$ | $\nu_5 = 1.0$ | $\phi_5 = 22.0$ |

TABLE 1-continued

| Type of Lenses | Lens No. | Curvature mm | Distance mm | Refractive Index | $\nu$ value | Effective Diameter mm |
|---|---|---|---|---|---|---|
| Member | | $R_6 = 88.22$ | $D_6 = 1.1$ | $N_6 = 1.58600$ | $\nu_6 = 34.8$ | $\phi_6 = 18.0$ |
| | $G_4$ | $R_7 = -268.26$ | $D_7 = 5.0$ | $N_7 = 1.0$ | $\nu_7 = 1.0$ | $\phi_7 = 18.0$ |
| | | $R_8 = -27.56$ | $D_8 = 1.0$ | $N_8 = 1.49200$ | $\nu_8 = 57.8$ | $\phi_8 = 18.0$ |
| Master Lens | $G_5$ | $R_9 = 33.2$ | $D_9 = 2.9$ | $N_9 = 1.0$ | $\nu_9 = 1.0$ | $\phi_9 = 17.8$ |
| | | $R_{10} = 904.6$ | $D_{10} = 0.2$ | $N_{10} = 1.62041$ | $\nu_{10} = 29.5$ | $\phi_{10} = 18.0$ |
| | $G_6$ | $R_{11} = 16.7$ | $D_{11} = 6.9$ | $N_{11} = 1.0$ | $\nu_{11} = 1.0$ | $\phi_{11} = 17.0$ |
| | | $R_{12} = 81.8$ | $D_{12} = 0.8$ | $N_{12} = 1.65160$ | $\nu_{12} = 58.5$ | $\phi_{12} = 14.0$ |
| | $G_7$ | $R_{13} = -132.75$ | $D_{13} = 7.0$ | $N_{13} = 1.0$ | $\nu_{13} = 1.0$ | $\phi_{13} = 14.0$ |
| | | $R_{14} = 9.1$ | $D_{14} = 3.1$ | $N_{14} = 1.72825$ | $\nu_{14} = 28.3$ | $\phi_{14} = 9.0$ |
| | $G_8$ | $R_{15} = 16.2$ | $D_{15} = 6.4$ | $N_{15} = 1.$ | $\nu_{15} = 1.0$ | $\phi_{15} = 10.5$ |
| | | $R_{16} = -21.1$ | | $N_{16} = 1.71300$ | $\nu_{16} = 53.9$ | $\phi_{16} = 10.5$ |

I claim:

1. A lens attachment for forming wide-ranging images, which comprises a master lens 3, a front member 1 and a rear member 2, said front member and rear member including cylindrical lenses and being located in front of said master lens, said cylindrical lenses being made of optical plastics and being combined on a mount 17, said each lens and said mount including tenons and recesses so as to allow said lenses and said mount to be connected from one to another in a fitting relationship, said tennons and said recesses being produced axially with the lens axis, whereby precise centering of said lenses is provided by engaging the tennons and recesses of said lenses and by engaging said tennons and recesses of said lenses and said mount.

2. A lens attachment as set forth in claim 1, wherein said mount 17 comprises dividable front part $17_A$ and rear part $17_B$, said each part being rotatable with respect to the other about the common lens axis, thereby allowing of circumferential adjustment of said lenses without causing any deviation of distance between optical axes.

3. A lens attachment as set forth in claim 1, wherein said mount 17 is covered with a cylindrical casing 29 including a shoulder portion 32 and a rearward portion extending beyond said shoulder portion, said rearward portion of said casing being rotatably supported in a sleeve 26 through ring-shaped bands of soft material 25, and being provided with ring-shaped groove 33 in its end portion, said sleeve including a retractible screw 34 adapted to fit in said ring-shaped groove, and being adapted to be secured in a main optical instrument 27, thereby allowing said cylindrical casing 29 to rotate about its own axis without causing any deviation in its axial direction.

* * * * *